E. A. VONDE VELD.
LIQUID MEASURING AND DISPENSING DEVICE.
APPLICATION FILED JAN. 15, 1916.
1,276,136.
Patented Aug. 20, 1918.
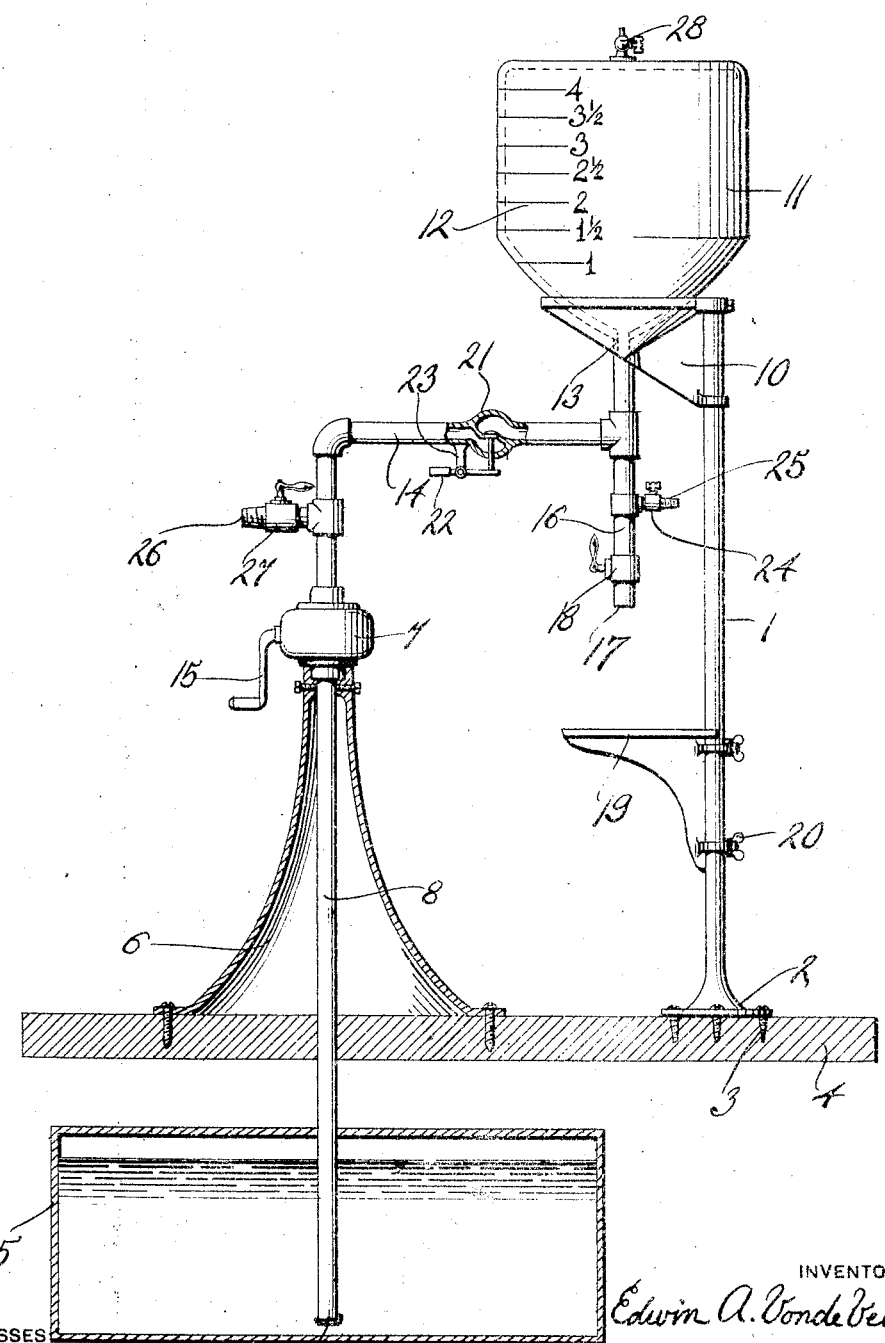
INVENTOR
Edwin A. Vonde Veld.
WITNESSES
BY
ATTORNEY

UNITED STATES PATENT OFFICE.

EDWIN A. VONDE VELD, OF WILLARD, NEW MEXICO.

LIQUID MEASURING AND DISPENSING DEVICE.

1,276,136.

Specification of Letters Patent. Patented Aug. 20, 1918.

Application filed January 15, 1916. Serial No. 72,274.

*To all whom it may concern:*

Be it known that I, EDWIN A. VONDE VELD, a citizen of the United States, residing at Willard, in the county of Torrance and State of New Mexico, have invented certain new and useful Improvements in Liquid Measuring and Dispensing Devices, of which the following is a specification.

An object of my invention is to provide a fluid measuring and dispensing device which is so arranged that gasolene, oil, or other liquid to be dispensed, may be stored in a main container or reservoir and passed through a graduated measure, the parts being so arranged that when the desired quantity of liquid has been supplied to the measure, the supply may be stopped and a discharge may be opened to permit the liquid to flow into a tank or other container which is to be filled.

A further object is to provide a reversible pump which is arranged to supply the liquid to the graduated measure and which is at the same time so arranged that it may be operated in a reversed direction to take the gasolene or other liquid from a tank car or other supply and discharge this liquid into the storage reservoir.

Yet another object is in the mounting of means in the supply pipe of the reservoir to the graduated measure, which means is so arranged that as the liquid is being pumped to the reservoir it is checked against back flow and as the operator may desire to discharge any part of the liquid from the graduated measure, a hand operating lever may be moved to release this check in the supply pipe and the liquid will then flow from the graduated measure in a return path to the storage reservoir.

With the above and other objects in view, my invention consists in certain novel features of construction and combination of parts which will be hereinafter set forth in connection with the drawings and then pointed out in the claims.

The figure of the drawing illustrates in a diagrammatic view the general arrangement of the parts, certain of the casings and other features being broken or sectioned to better illustrate the operating mechanism.

A supporting standard 1 is provided with a base 2 by which it may be mounted at any desired point and it is preferable that screws 3 or other fastening means be passed through this base and into a supporting member 4 which may be wood, concrete, or any other suitable material, or the screws 3 might be extended to a greater length and the supporting standard 1 mounted directly upon the ground.

A liquid storage reservoir 5 is preferably buried in the ground as such a mounting will make the structure more safe and will at the same time better comply with fire regulations, and a pump standard 6 is mounted on the base 4 directly above the storage reservoir 5. A pump 7, which in the present instance is shown as of the rotary type, is mounted on the upper end of the pump standard 6, and a pipe 8 is led from this pump to a point near the bottom of the storage reservoir 5, a screen 9 being provided over the lower ends thereof to strain the liquid as it is taken up by the pump 7.

A supporting bracket 10 is mounted on the upper end of the standard 1 and a measuring tank 11 is mounted on this supporting bracket 10, this measuring tank being preferably of glass so that the contents thereof will be visible to the operator and it also being preferable that the graduations as indicated at 12 be placed on, etched into, or otherwise indicated throughout the height of the measuring tank 11. It is preferable that this measuring tank 11 be fixed in the manner shown in the drawings, where the lower ends around the opening 13 into the tank is sloped gradually upwardly in a simulation of a funnel and is bent first into the side walls of the tank proper.

A pipe 14 is connected from the pump casing 7 to the opening 13 of the measuring tank 11 and thus by operation of the crank handle 15 of the pump 7, liquid is drawn from the storage reservoir 5 through the pipe 8 and is then passed through the pump 7 and through the pipe 14 to pass through the mouth 13 of the graduated measuring tank 11 where it will rise up in this tank and the quantity of liquid contained in the tank will be indicated by the graduation at 12.

A discharge pipe 16 is connected with the supply 14 and it is formed as an extension of the vertical extending section which connects the mouth opening 13 of the measuring tank 11. A discharge valve 18 is connected in the discharge pipe 16 at a point adjacent the discharge nozzle 17, and thus during the filling of the measuring tank 11 or during the supply of the desired quantity of liquid thereinto, this valve 18 will be kept closed to close the discharge through the nozzle 17, and when the desired quantity of liquid has been supplied to the measuring tank 11, this liquid may be discharged through the nozzle 17 by the opening of the valve 18. A supporting rest 19 is adjustably mounted on the standard 1 to be at the proper height by the adjustment of the clamping nuts 20, and the tank or can may be placed upon this supporting rest 19 below the discharge nozzle 17 when the contents of the measuring tank is to be discharged.

A check valve 21 is connected in the supply pipe 14 to stop the back flow of the liquid from the measuring tank 11 during the normal operation of the device, and the stem of this check valve is extended through the valve casing to be in the path of the tripping lever 22 which is pivoted on the bracket 23, so that upon actuation of this trip lever 22 to bring the same to a bearing engagement against the stem of the check valve, this check valve will be raised to such a position that the liquid may flow back through the supply pipe 14 from the measuring tank 11 and by turning the pump handle 15 in the reversed direction, the liquid will not only be supplied through the pipe 8 to the storage reservoir, but at the same time, a suction will be created to increase the flow due to gravity and will at the same time insure that all of the liquid is exhausted from the measuring tank.

A discharge valve 24 is connected with the discharge pipe 16 at a point above the valve 18, and a hose nipple 25 is formed as a part of the valve casing so that by the attachment of a lead or other hose or tube to this nipple 25, the supply may be led direct to the tank of an automobile or to any other tank, it of course being understood that the valve 18 will be maintained in the closed relation during the discharge of the liquid through the valve 24.

As is stated, the pump 7 is made to be of the reversible type, that is, it will operate in either direction, rotation of the crank operating handle 15 in one direction causing the pump to act as a suction pump and in turning of the handle in the opposite direction, causing actuation of the force pump or to discharge the liquid in the reverse direction. A hose nipple 26 is connected with the pipe 14 at a point above the pump casing 7 and an intake valve 27 is formed in this nipple so that in filling the storage reservoir 5, all that is necessary is that the nipple 26 be connected with a hose which is led to a tank car or other container and that the crank handle 15 of the pump turned to cause a suction through the pipe 14 in which the check valve 21 will remain in its closed relation and a suction will be created through the hose nipple 26 when the valve 27 has been opened to draw the liquid in through the pump casing 7 and discharge it through the pipe 8 into the storage reservoir 5.

An air petcock 28 is mounted on the upper end of the measuring tank 11, and this cock 28 may be opened when liquid is being supplied to the measuring tank 11 to permit the air to escape from the tank, or when the contents is being discharged through the nozzle 17 or is to be withdrawn from the reverse actuation of the pump, this petcock 28 is opened to allow air to flow into the tank and to thus relieve the attraction for the liquid which would otherwise exist were this tank 11 made and maintained air-tight.

From the foregoing it will be seen that I have provided a liquid measuring and dispensing device which has the parts thereof so arranged that the liquid may be taken from a source of supply and pumped to the storage reservoir, from which it may be taken by a reverse actuation of the pump and supplied to a graduated measuring tank, the parts being so arranged that leakage of the liquid back through the source of supply is prevented and a suitable discharge being provided to permit the liquid to be drawn from the graduated measuring tank and supplied to the tank, can, or other receptacle desired to be filled, and further it will be seen by actuation of the trip lever 22, the check valve 21 will be opened and thus any surplusage of liquid contained in the measuring tank 11 may be drawn back through the supply pipe 14 and again discharged into the storage reservoir 5.

While I have herein shown and described only one specific form of my invention, it will be understood that modifications and variations might be resorted to in the form and arrangement of the parts and hence, I do not wish to be limited to the exact disclosure but only to such points as may be set forth in the claims.

I claim:—

1. In a liquid measuring and dispensing apparatus, a reversible pump, a storage tank, a pipe connected with one side of the reversible pump and leading into the tank to withdraw and supply liquid fuel from and to the same, a measuring tank disposed at a suitable distance from the reversible pump, a second pipe connected with the opposite side of the reversible pump and connected with the measuring tank, a check valve connected in the second named pipe and normally operating to permit of the passage of liquid fuel from the reversible pump to the measuring tank and to prevent the passage of liquid fuel through this pipe in an opposite direction, means to open the check valve and hold the same in the open position so that its normal function is prevented, coupling connected in the second named pipe between the reversible pump and the check valve, and a valve connected with the coupling.

2. In a liquid measuring and dispensing apparatus, a reversible pump, a storage tank arranged beneath the same, a pipe connected with one side of the reversible pump and leading into the storage tank, a measuring tank arranged above the reversible pump, a substantially vertically arranged discharge pipe connected with the lower end of the measuring tank, a cut off valve connected in the discharge pipe, a third pipe connected with the opposite side of the reversible pump and connected with the discharge pipe between the measuring tank and the cut off valve, a check valve connected in the third named pipe and normally operating to permit of the flow of liquid fuel from the reversible pump to the measuring tank and to prevent such flow through the third named pipe in an opposite direction, manually operated means adapted to unseat the check valve and retain the same unseated whereby its normal function is prevented and liquid may flow in an opposite direction through the third named pipe, a coupling connected in the third named pipe between the reversible pump and the check valve, and a valve connected with the coupling.

3. In apparatus of the character described, a storage tank for arrangement beneath the surface of the ground or the like, a reversible pump, means for supporting the pump at a point above the surface of the ground or the like in convenient reach of the operator, a pipe connecting one side of the pump with the tank, an upstanding support arranged near the pump, a tank secured to the support and having means to measure the liquid supplied thereto, a second pipe serving to connect the opposite side of the pump with the second named tank, a check valve connected in the second named pipe, means to open the check valve and hold the same in the open position, and an outlet conduit connected with the second named pipe between the pump and the check valve.

4. In apparatus of the character described, a storage tank for arrangement beneath the surface of the ground or the like, a reversible pump, means for supporting the pump at a point above the surface of the ground or the like in convenient reach of the operator, a pipe connecting one side of the pump with the tank, an upstanding support arranged near the pump and extending above the same for a substantial distance, a transparent tank connected with the top of the support and provided with graduations to indicate the contents thereof, a second pipe connecting the transparent tank and the opposite side of the pump, a valve connected in the second named pipe, a coupling connected with the second named pipe between the pump and the first named valve, a valve connected with the coupling, a depending pipe connected with the second named pipe between the transparent tank and the first named valve, a valve connected in the depending pipe, and a support member secured to the upstanding support and adapted for holding a receptacle near and beneath the discharge end of the depending pipe In testimony whereof I affix my signature in presence of two witnesses.

EDWIN A. VONDE VELD.

Witnesses:
 GEO. S. ALTER,
 L. H. HANLON.